United States Patent [19]

Holub

[11] Patent Number: 5,290,573

[45] Date of Patent: * Mar. 1, 1994

[54] ANIMAL FEED SUPPLEMENT

[76] Inventor: Bruce J. Holub, 19 Maplewood Dr., Guelph, Ontario N1G 1L9, Canada

[*] Notice: The portion of the term of this patent subsequent to Mar. 27, 2007 has been disclaimed.

[21] Appl. No.: 474,510

[22] Filed: Feb. 2, 1990

Related U.S. Application Data

[63] Continuation of Ser. No. 234,175, Aug. 19, 1988, Pat. No. 4,911,944.

[30] Foreign Application Priority Data

Aug. 19, 1987 [CA] Canada ................................. 545565

[51] Int. Cl.$^5$ .............................................. A23K 1/00
[52] U.S. Cl. ................................. 426/2; 426/635; 426/643; 426/646; 426/807
[58] Field of Search .................. 426/635, 2, 646, 807, 426/643; 514/560

[56] References Cited

U.S. PATENT DOCUMENTS

| | | | |
|---|---|---|---|
| 2,302,927 | 11/1942 | Whitmoyer | 99/2 |
| 3,159,489 | 12/1964 | Murphy | 99/107 |
| 3,359,115 | 12/1967 | Lanz | 426/643 |
| 3,561,976 | 2/1971 | Weber | 99/107 |
| 3,669,676 | 6/1972 | Karr et al. | 99/7 |
| 3,925,560 | 12/1975 | Scott et al. | 426/2 |
| 4,073,960 | 2/1978 | Scott et al. | 426/2 |
| 4,197,294 | 4/1980 | Klein | 426/2 |
| 4,738,853 | 4/1988 | Horrobin | 426/2 |
| 4,777,162 | 10/1988 | Hijiya | 514/58 |
| 4,880,639 | 11/1989 | Lauermann et al. | 426/2 |
| 4,911,944 | 3/1990 | Holub | 426/635 |
| 4,918,104 | 4/1990 | Weiss et al. | 514/560 |
| 4,960,795 | 10/1990 | Salte et al. | 514/560 |
| 5,012,761 | 5/1991 | Oh | 426/2 |
| 5,091,195 | 2/1992 | Havens | 426/2 |
| 5,106,639 | 4/1992 | Lee et al. | 426/807 |

FOREIGN PATENT DOCUMENTS

| | | |
|---|---|---|
| 646423 | 10/1964 | Belgium . |
| 412389 | 5/1943 | Canada . |
| 412486 | 5/1943 | Canada . |
| 61-271957 | 12/1986 | Japan . |
| WO85/02323 | 6/1985 | PCT Int'l Appl. . |
| WO88/10112 | 12/1988 | PCT Int'l Appl. . |
| 263014 | 12/1926 | United Kingdom . |
| 280774 | 11/1927 | United Kingdom . |
| 484822 | 5/1938 | United Kingdom . |
| 621207 | 4/1949 | United Kingdom . |
| 651861 | 11/1951 | United Kingdom . |
| 1356002 | 8/1972 | United Kingdom . |
| 2208783 | 4/1989 | United Kingdom . |

OTHER PUBLICATIONS

Kirk Othmer Encyclopedia of Chemical Technology 3rd Ed. vol. 9 (1980) pp. 795–831.

Morrison "Feeds and Feeding" Morrison Publishing Co. Ithaca, N.Y. (1957) pp. 524–527 and 1120–1121.

McGraw-Hill Encyclopedia of Food, Agriculture & Nutrition, 1977, pp. 300–301.

"Flavour Studies with Fish Means and with Fish Oil Fractions in Broiler Diets", J. Sci. Fd. Agric. 1973, 24, 451–461, by Jacobus Wessels, et al.

"Comprehensive Evaluation of Fatty Acids in Foods", by Jacob Exler, et al., Journal of the American Dietetic Association, vol. 69(3) 1976, pp. 243–248.

Primary Examiner—R. B. Penland
Attorney, Agent, or Firm—Baker & Daniels

[57] ABSTRACT

Fish meal containing omega-3 unsaturated fatty acids is useful as a feed additive for beef cattle feed.

11 Claims, No Drawings

ANIMAL FEED SUPPLEMENT

This is a continuation of application Ser. No. 234,175, filed Aug. 19, 1988, U.S. Pat. No. 4,911,944.

The present invention relates to the field of animal husbandry, and in particular to the formulation of animal feeds and additives for animal feeds.

One of the prime objects in raising animals for meat production is to produce as healthful a product as possible, while maintaining commercially acceptable standards of, among other things, taste, texture and profitability.

It is known that increasing one's intake of omega-3 unsaturated fatty acids, in particular eicosapentaenoic acid (EPA) and docosahexaenoic acid (DHA) may be very beneficial to one's health. In particular, these fatty acids have been shown to reduce hypertension and also to reduce serum lipids. For instance, Singer et al reported in "Long-term Effect of Mackerel Diet on Blood Pressure, Serum Lipids and Thromboxane Formation in Patients with Mild Hypertension" (Atherosclerosis, Vol. 62, p.259-265 (1986)) that a mackerel diet (mackerel being high in EPA) resulted in lowering of systolic and diastolic blood pressure, and lowering of serum triglyceride and cholesterol levels. Fish oil concentrate containing EPA has also been found to lower blood pressure and plasma triglycerides when given orally to human subjects by Mortensen et al. (Thromobosis and Haemestasis, Vol. 50, p.543-546 (1983).

Moreover, the Applicant and Ahmed A. Ahmed reported in 1984 (Alteration and Recovery of Bleeding Times, Platelet Aggregation and Fatty Acid Composition of Individual Phospholipids in Platelets of Human Subjects Receiving a Supplement of Cod-Liver Oil" Lipids, Vol. 19, p.617-624 (1984)) that ingestion of a fairly concentrated form of EPA, (Cod-liver oil) will result in significant alteration of the fatty acid composition of platelet phospholipids, with an increase in the amount of EPA present therein and a decrease in the amount of arachidonate present therein. This results in an increase in bleeding times, due to a lessening in platelet aggregation, and, more significantly, a strong suggestion that high—EPA platelets interact less with blood vessels walls than low EPA-high arachidonate do. This suggests that EPA may decrease the incidence of coronary thrombosis.

The sources of EPA are principally cold water marine fish, such as mackerel. These types of fish are staples in the diets of many peoples, such as the Greenland Eskimos and Coastal Norwegians. However, in other areas of the world, particularly North America, the consumption of fish is not nearly high enough for people to benefit from EPA or DHA (also found in cold water marine fish, and capable of producing similar effects) intake. That is, the principle sources of animal protein in North America are beef cattle, swine and chicken (poultry), and none of these sources yields meat which is high in omega-3 unsaturated fatty acids (EPA or DHA). In fact, each (but poultry to a minor extent only) tends to be high in saturated fats and cholesterol, thereby making them health risks.

There has been a trend of late for persons interested in maintaining good health to ingest fish oil (e.g., cod liver oil) or EPA supplements in capsule form. This is an expensive and potentially unhealthy way of making sure that sufficient omega-3 unsaturated fatty acid is in the diet. This approach results in the consumption of extra fat calories without the nutritional benefits of ingesting protein, vitamins, and minerals as occurs when food rather than pharmaceutical sources of omega-3 are consumed. Furthermore, excessive and potentially unsafe levels of omega-3 fatty acids are unlikely to be consumed when taken in food sources.

The object of the present invention is to provide a novel feed supplement or additive for use in the production of feeds for beef cattle, swine and poultry, the use of which will result in a beef, pork or poultry meat (as the case may be) with enhanced omega-3 unsaturated fatty acid content.

Accordingly, in one broad aspect, the present invention relates to, as a feed additive for beef cattle, fish meal containing omega-3 unsaturated fatty acids.

The applicant has found, quite expectedly, that when beef cattle are fed a source of EPA, such as fish meal made from ocean fish, there is incomplete breakdown of the EPA in the digestive system of the animal, and a significant amount of that EPA is incorporated in the flesh of the animal, displacing naturally occuring fatty acids. There is no ill effect on the animal, and it is not necessary to feed massive quantities of fish meal supplement to the animal over prolonged periods of time. They tend to assimilate the EPA from the fish meal into their own flesh fairly rapidly so that it may be necessary to feed the supplement to beef cattle for as little as six weeks before slaughter to bring EPA levels in the beef flesh to a desirable level.

The following example will illustrate the present invention.

EXAMPLE

Three beef cattle were fed a ration having an 8% fish meal content. The fish meal had an EPA content of 10.6% and a DHA content of 11.0%, each being expressed as a percentage of the total fatty acid content of the fish meal. A suitable source (i.e. species) for fish meal of this omega-3 unsaturated fatty acid content is ground whole mackerel (scaled). The cattle were fed the foregoing ration for 20 weeks.

Three control cattle were fed a similar quantity of ration, but with no added fish meal.

The six animals were subsequently slaughtered and butchered and rib-eye steaks from each of them analyzed. The results were as follows:

TABLE A

| Diet | % of fatty acids in meat as EPA | % of fatty acid in meat as DHA |
| --- | --- | --- |
| No fish meal | 0.5 ± 0.3 | 0.2 ± 0.1 |
| 8% fish meal | 1.6 ± 0.3 | 1.4 ± 0.4 |

It will be observed, therefore, that the total enrichment of omega-3 unsaturated fatty acid was about fourfold (0.7 vs 3.0).

It is expected, moreover, that protein encapsulation of the omega-3 unsaturated fatty acid prior to feeding would further increase the concentration thereof in the end product. This would prevent degradation of omega-3 unsaturated fatty acid by the rumen. Moreover, because neither swine nor poultry have a rumen, even more favourable yields of omega-3 unsaturated fatty acids in the carcasses of fish meal fed pigs and chickens can be confidently expected.

I claim:

1. In a ruminant feed, a feed additive consisting essentially of fish meal containing an omega-3 unsaturated fatty acid selected from the group consisting of eicosapentaenoic acid (EPA), docosahexaenoic acid (DHA), and a mixture thereof.

2. The feed additive claimed in claim 1, wherein said fish meal is made from mackerel.

3. The feed additive claimed in claim 1, wherein said fish meal is made from herring.

4. In a ruminant feed, a feed additive consisting essentially of fish meal containing an omega-3 unsaturated fatty acid selected from the group consisting of eicosapentaenoic acid (EPA), docosahexaenoic acid (DHA), and a mixture thereof, said feed additive being in an amount of about 5% to 15% by weight of the total feed.

5. The feed additive claimed in claim 4, wherein said fish meal is made from mackerel.

6. The feed additive claimed in claim 4, wherein said fish meal is made from herring.

7. A method of feeding a ruminant, the method comprising the steps of:
providing a feed additive for the ruminant consisting essentially of fish meal containing an omega-3 unsaturated fatty acid selected from the group consisting of eicosapentaenoic acid (EPA), docosahexaenoic acid (DHA), and a mixture thereof, said feed additive having an EPA content of about 10.6% and a DHA content of about 11.0%, each percentage being a percentage of the total fatty acids in the fish meal;
adding said feed additive to a feed for the ruminant, until said feed additive constitutes about 5% to 15% by weight of the total feed; and
feeding the ruminant said feed for a period of about 20 weeks.

8. The method according to claim 7, including the step of:
providing said feed additive, wherein said fish meal is made from mackerel.

9. The method according to claim 7, including the step of:
providing said feed additive, wherein said fish meal is made from herring.

10. The method according to claim 7, including the step of:
providing said feed additive in an amount of about 8% by weight of the total feed.

11. The method according to claim 10, including the step of:
providing said feed additive, wherein said fish meal is made from mackerel.

* * * * *